Oct. 17, 1961  G. H. ASHTON  3,004,698
BAGS
Filed April 14, 1958  5 Sheets-Sheet 1
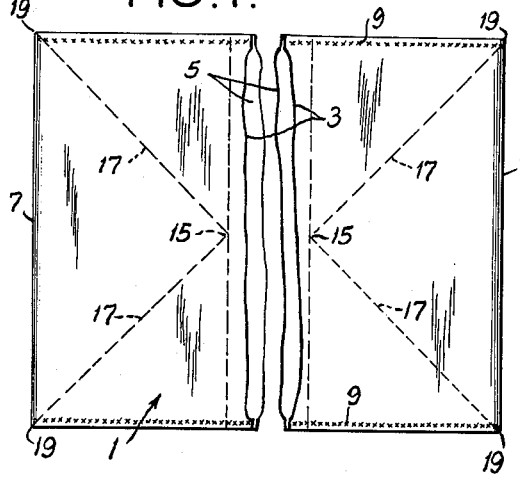
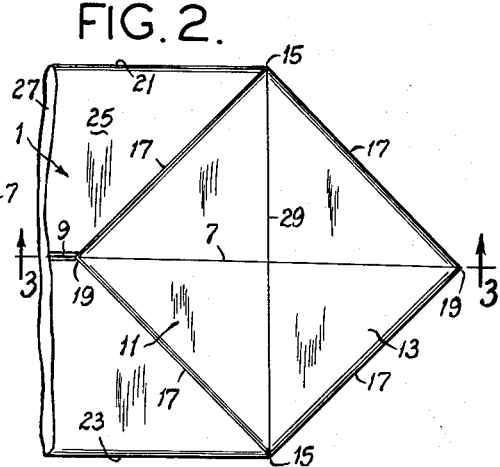
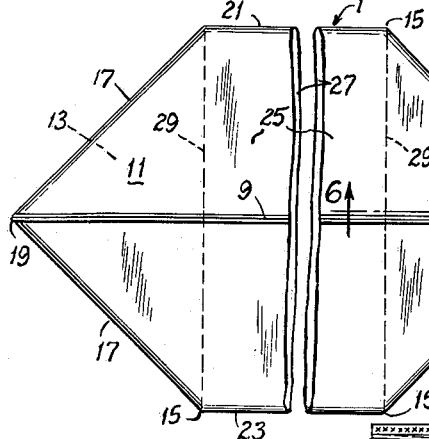
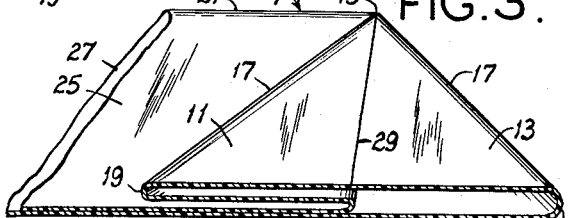
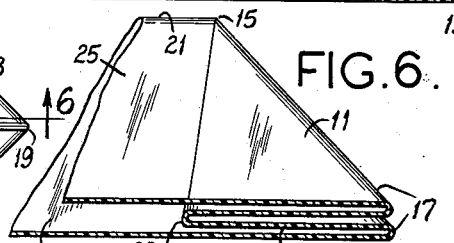
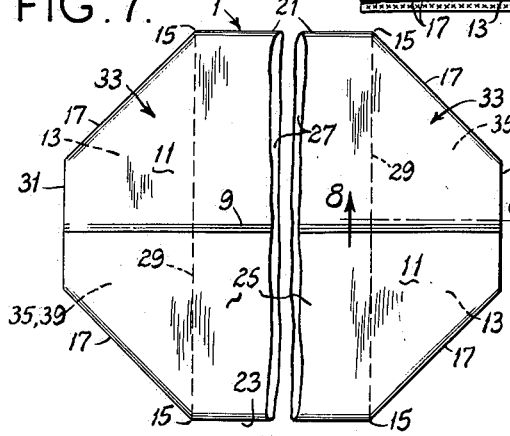
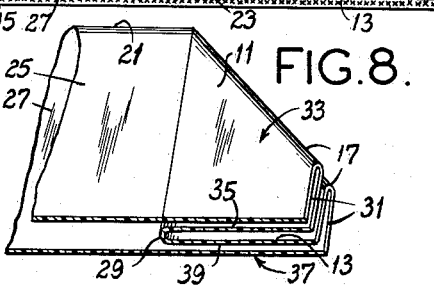
George H. Ashton,
Inventor.
Koenig and Pope,
Attorneys.

Oct. 17, 1961 G. H. ASHTON 3,004,698
BAGS
Filed April 14, 1958 5 Sheets-Sheet 2
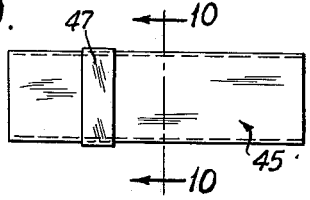
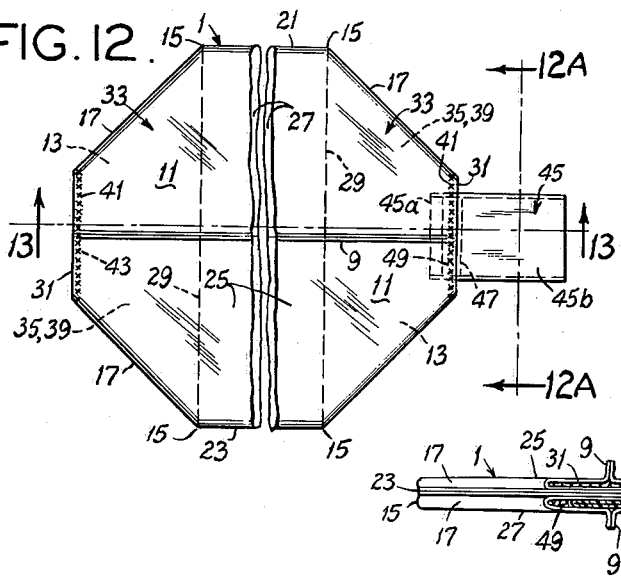
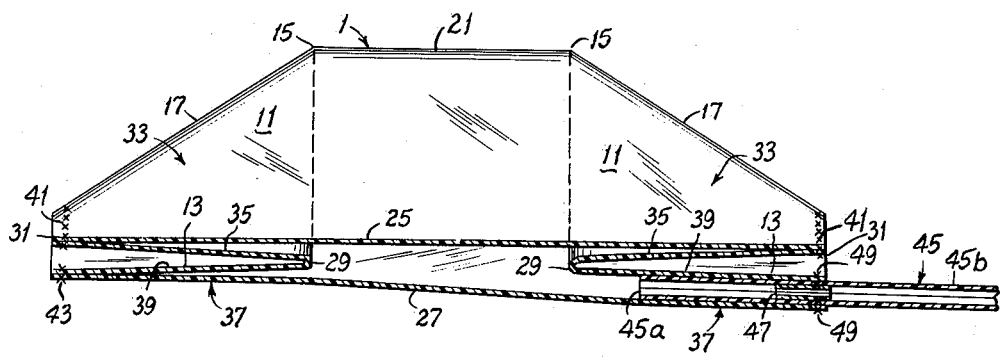
George H. Ashton,
Inventor.
Koenig and Pope,
Attorneys.

Oct. 17, 1961  G. H. ASHTON  3,004,698
BAGS
Filed April 14, 1958  5 Sheets-Sheet 3

George H. Ashton,
Inventor.
Koenig and Pope,
Attorneys.

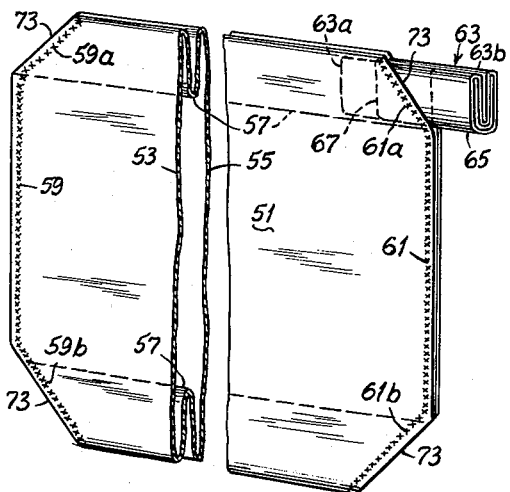
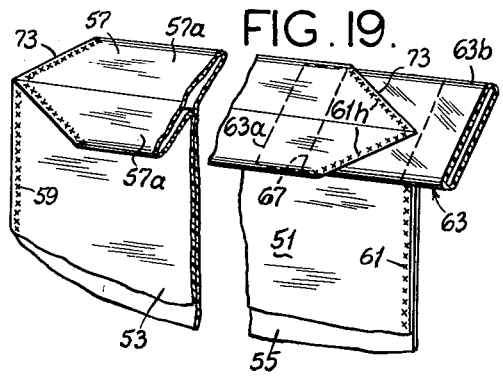
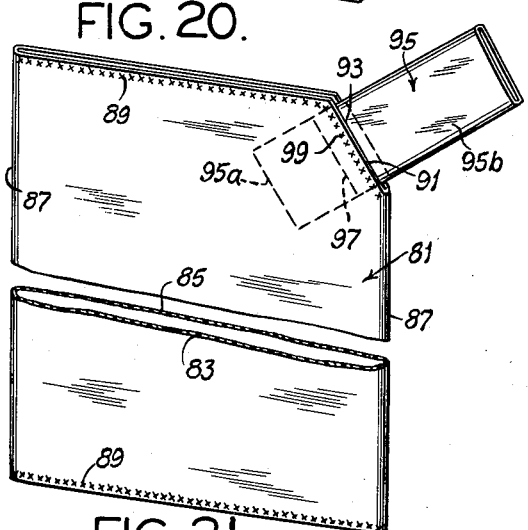
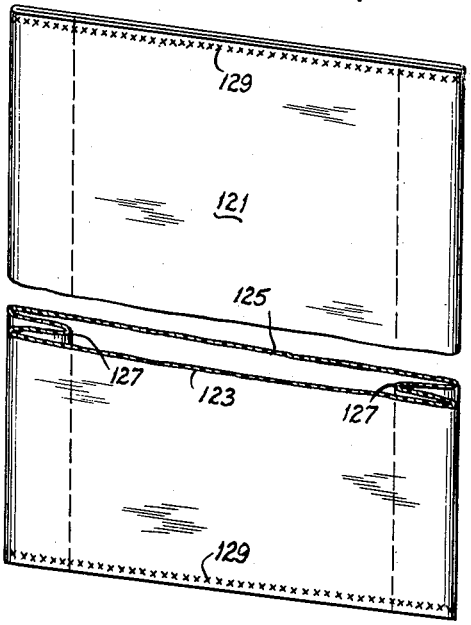
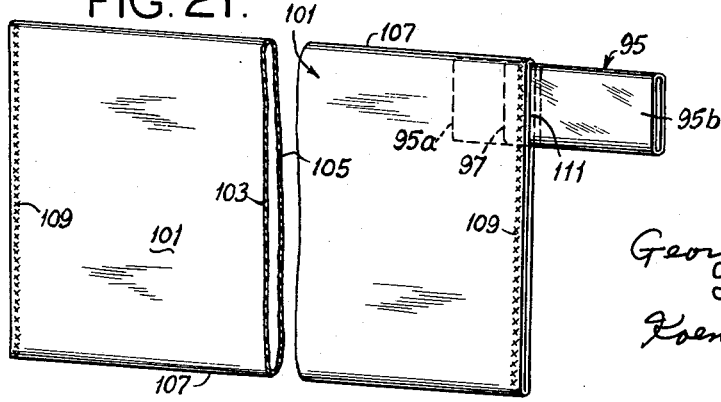

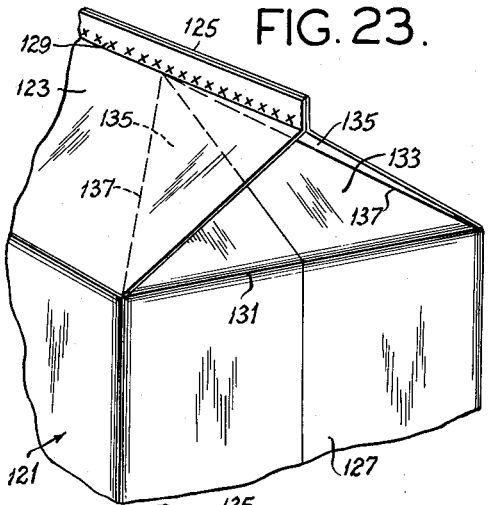
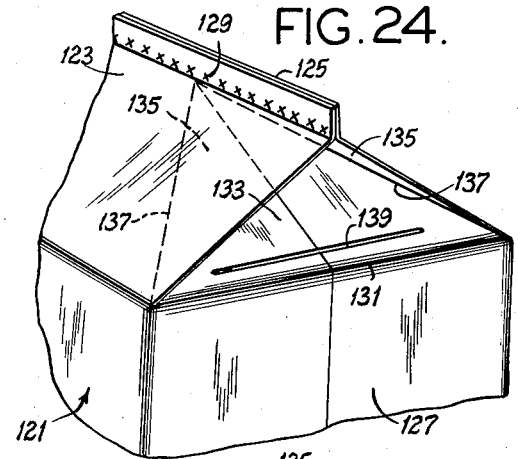
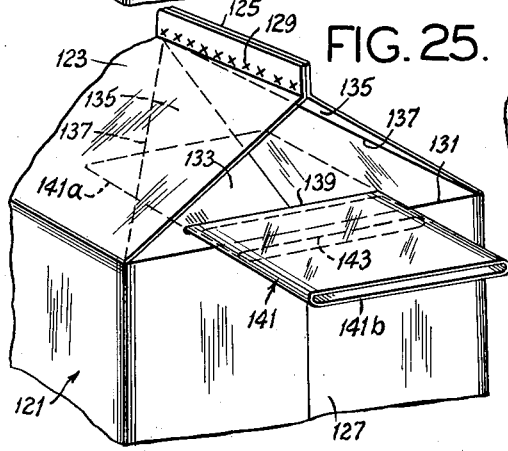
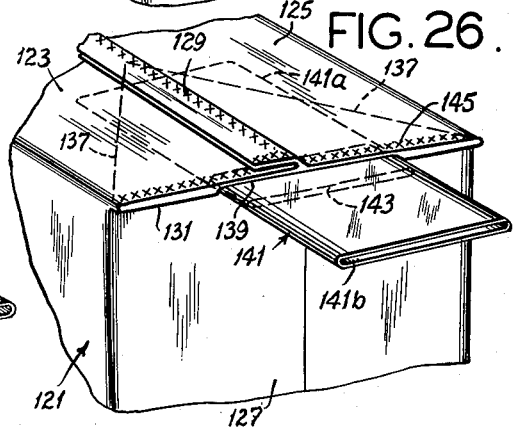
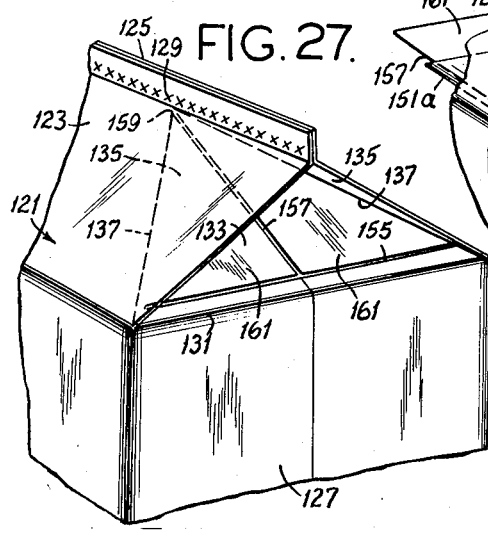
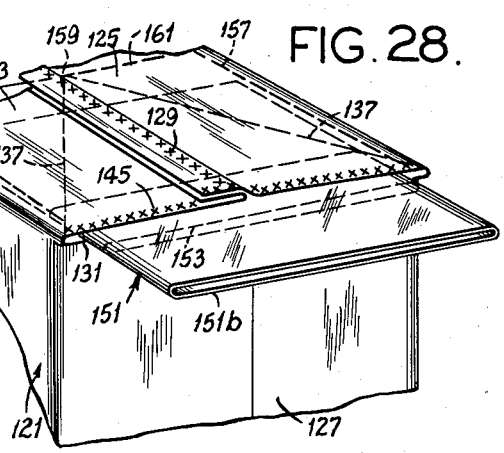

United States Patent Office 3,004,698
Patented Oct. 17, 1961

3,004,698
BAGS
George H. Ashton, Sappington, Mo., assignor to Bemis
Bro. Bag Company, St. Louis, Mo., a corporation of
Missouri
Filed Apr. 14, 1958, Ser. No. 728,425
1 Claim. (Cl. 229—62.5)

This invention relates to bags, and more particularly to valve bags made of heat-sealable plastic such as polyethylene.

Among the several objects of the invention may be noted the provision of bags made of heat-sealable plastic such as polyethylene having a valve which includes an inwardly projecting valve extension for closing the bag after it has been filled and an outwardly projecting valve extension for receiving a filling spout; and the provision of bags of this class in which the stated extensions are constituted by the inner and outer end portions of a tube heat-sealed to the bag material and open throughout its length. Other objects and features will be in part apparent and in part pointed out hereinafter.

The invention accordingly comprises the constructions hereinafter described, the scope of the invention being indicated in the following claim.

In the accompanying drawings, in which several of various possible embodiments of the invention are illustrated, FIG. 1 is a side elevation of a length of tubing of heat-sealable plastic, such as polyethylene, from which a first species of bag of this invention is made;

FIG. 2 is a view of the right end portion of FIG. 1 illustrating an operation on the FIG. 1 tubing in the manufacture of the first species;

FIG. 3 is a perspective view in cross section on line 3—3 of FIG. 2;

FIG. 4 is a side elevation of the FIG. 1 tubing illustrating a further operation;

FIG. 5 is an edge elevation of FIG. 4 as viewed from below FIG. 4;

FIG. 6 is a perspective view in cross section on line 6—6 of FIG. 4;

FIG. 7 is a view similar to FIG. 4 illustrating a further step in the manufacture of the first species;

FIG. 8 is a perspective view in cross section on line 8—8 of FIG. 7;

FIG. 9 is a side elevation illustrating a tube in process of preparation for use in the first species;

FIG. 10 is a transverse cross section of the FIG. 9 tube taken on line 10—10 of FIG. 9;

FIG. 11 is a section similar to FIG. 10 but illustrating the tube in its finished condition;

FIG. 12 is a side elevation of a completed bag of the first species;

FIG. 12A is a cross section taken on line 12A—12A of FIG. 12;

FIG. 13 is a perspective view of the finished bag of the first species in cross section on line 13—13 of FIG. 12;

Figure 14:
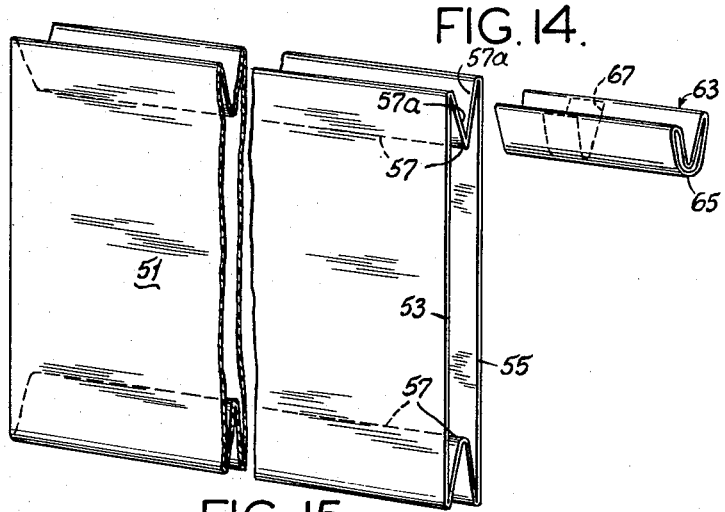
Figure 15:
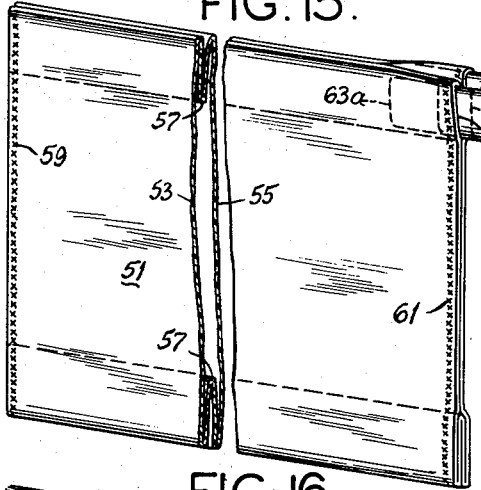
Figure 17:
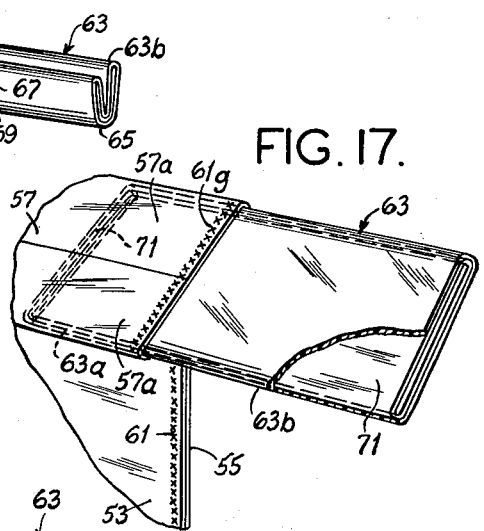
Figure 16:
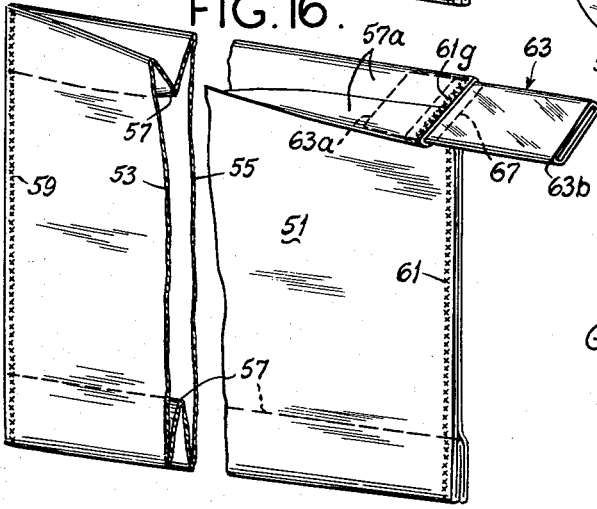

FIG. 14 to an exploded perspective view illustrating the manufacture of a second species of bag of this invention;

FIG. 15 is a perspective view illustrating a completed bag of the second species;

FIG. 16 is a view similar to FIG. 15 illustrating the upper gusset and the tube of the FIG. 15 bag in an unfolded condition;

FIG. 17 is a fragmentary perspective view illustrating a third species of bag which is a modification of the FIG. 15 bag;

FIG. 18 is a view similar to FIG. 15 illustrating a fourth species of bag which is a modification of the FIG. 15 bag;

FIG. 19 is a fragment of FIG. 18 with the upper gusset and the tube of the FIG. 18 bag spread flat;

FIG. 20 is a perspective view illustrating a fifth species of bag of this invention;

FIG. 21 is a perspective view illustrating a sixth species of bag of this invention;

FIG. 22 is a perspective view illustrating a length of tubing from which a seventh species of bag of this invention is made;

FIG. 23 is a perspective view of the upper right-hand corner of FIG. 22 illustrating a step in the manufacture of the seventh species;

FIG. 24 is a view corresponding to FIG. 23 illustrating a further step;

FIG. 25 is a view corresponding to FIG. 24 illustrating a further step;

FIG. 26 is a view corresponding to FIG. 25 illustrating a completed bag of the seventh species;

FIG. 27 is a view similar to FIG. 24 illustrating an eight species which is a modification of the seventh species; and, FIG. 28 is a view similar to FIG. 26 illustrating the eighth species.

Corresponding reference characters indicate corresponding parts throughout the several views of the drawings.

Referring to the drawings, FIGS. 1–8 illustrate the manufacture of a first species of valve bag of this invention, FIGS. 9–11 illustrate certain operations involving a tube or valve sleeve used in the bag, and FIGS. 12–13 illustrate the completed bag. FIG. 1 shows a length of flat seamless tubing 1 of heat-sealable plastic such as polyethylene. The front and back walls of the length of tubing 1 are designated 3 and 5. The vertical edges of the tubing as it appears in FIG. 1 are constituted by integral folds 7 of the plastic. The horizontal edges of the tubing as it appears in FIG. 1 are closed by transverse heat seals 9. The vertical dimension of the tubing as it appears in FIG. 1 is less than its horizontal dimension, and its vertical edges constituted by folds 7 are referred to as its ends. It will be understood that the tube 1 may be a longitudinally seamed tube instead of a seamless tube.

Each end of the tubing 1 is diamond-folded to provide, at each end, front and back triangular diamond-fold sections 11 and 13 which appear in FIGS. 2–6. FIGS. 2, 3 and 6 illustrate the formation of the diamond fold at the right end of the tubing, and it will be understood that the formation of the diamond fold at the left end of the tubing is the same. The diamond folding is accomplished by spreading apart the front and back walls 3 and 5 of the tube by pulling at points of the front and back walls such as indicated at 15 which lie at the intersections of lines 17 extending from the tube corners 19 at 45° angles to the end and sides of the tube. The result of this operation is to spread open the end of the tube to diamond shape, as shown in FIGS. 2 and 3, the sides of the diamond being constituted by lines 17, two opposite corners of the diamond being constituted by points 15 and the other two corners by the original tube corners 19. Also, the walls 3 and 5 of the tubing fold on lines 21 and 23, which become the side edges of the finished bag, and the heat selas 9 are then located in position extending centrally of the new front and back walls of the bag. These new front and back walls are designated 25 and 27. Wall 25 comprises one half of original tubing wall 3 and one half of original tubing wall 5. Wall 27 comprises the other half of original tubing wall 3 and the other half of original tubing wall 5. Each triangular end section 11 is folded over on line 29 extending between the points 15 to overlie the respective triangular end section 13, thereby providing the intermediate-stage article illustrated in FIGS. 4–6 having, at each end, the superimposed front and back triangular end sections 11 and 13.

As shown in FIGS. 7 and 8, the outer ends of the superimposed triangular end sections 11 and 13 are cut off on transverse lines 31 with the result that the triangular end sections are converted to isosceles trapezoidal shape converging toward the end of the bag. Thus, the front wall 25 of the bag has, at each end of the bag, the end portion 33 of trapezoidal shape converging toward the end of the bag. On the inside of this trapezoidal end portion 33 of the front wall is a trapezoidal panel 35 integrally joined to portion 33 by the integral folds 17 at the lateral margins of the latter. Similarly, the back wall of the bag has, at each end of the bag, the end portion 37 of trapezoidal shape converging toward the end of the bag. On the inside of this trapezoidal end portion 37 is a trapezoidal panel 39 integrally joined to portion 37 by the integral folds 17 at the lateral margins of the latter. The two trapezoidal panels 35 and 39 are integrally joined at their inner margins at fold 29.

Initially, each end portion 33 is separated from the respective panel 35 and each end portion 37 is separated from the respective panel 39 at their outer edges at 31. At the left end of the bag, the end portion 33 is heat-sealed at its outer edge as indicated at 41 in FIGS. 12 and 13 to the outer edge of the respective panel 35, and the end portion 37 is heat-sealed at its outer edge as indicated at 43 in FIGS. 12 and 13 to the outer edge of the respective panel 39. At the right end of the bag, the end portion 33 is heat-sealed at its outer edge as indicated at 41 (see FIG. 13) to the outer edge of the respective panel 35. Thus, three of the four trapezoidal end portions 33, 37 are heat-sealed at their outer edges to the outer edges of the respective trapezoidal panels 35, 39.

A flattened tube 45 (see FIGS. 12, 12A and 13) of heat-sealable material, such as polyethylene, is inserted between the trapezoidal end portion 37 and the respective trapezoidal panel 39 at the right end of the bag, through the opening at 31 between this portion 37 and this panel 39. This tube 45 is specially prepared to be of non-heat-sealing character on the interior thereof at least in the region thereof which lies inward of and adjacent the edges at 31 of this portion 37 and this panel 39. As shown in FIGS. 9–11, this may be accomplished by applying a band of pressure-sensitive adhesive cellophane tape 47, which is of non-heat-sealing character, around a length of tubing which is to constitute the tube 45 (FIGS. 9 and 10), then turning this length of tubing inside out (FIG. 11) so that the non-heat-sealing band 47 is on the interior of the tube 45. Finally, the tube 45 is heat-sealed to the margins of the stated trapezoidal end portion 37 and the stated panel 39 by heat-sealing along a transverse line 49 which is located at the band 47. This heat-sealing results in fusion of the tube 45 to the end portion 37 and panel 39 without sticking together of the walls of the tube by reason of the non-heat-sealing character of the band 47, and it also results in fusion of end portion 37 and panel 39 directly together laterally outward of tube 45.

In the completed bag (FIGS. 12–13), the tube has a portion 45a inside the bag and a portion 45b outside the bag. Portion 45b is adapted to receive a filling spout for filling the bag with pulverized or granular solid material, for example, or liquid material. Portion 45a flattens out when the bag is filled with pulverized or granular solid material to close the bag. It may be provided with a longitudinal slit or slits at its inner end to facilitate entry of the material into the bag to avoid clogging the spout. If the bag is filled with liquid, portion 45b may be heat-sealed to seal the bag. The bag, when filled, assumes a generally rectangular shape in cross section in a plane parallel to the ends of the bag, each end of the bag also assuming a rectangular shape, the ends of which are defined by the heat seals 41, 43, 49.

FIG. 14 illustrates the manufacture of a second species of valve bag of this invention, and FIGS. 15 and 16 illustrate the completed bag. As shown in FIG. 14, the bag is made from a length of gusseted tubing 51 of the heat-sealable plastic such as polyethylene. The front and back walls of the tubing 51 are designated 53 and 55. These are joined at what become the top and bottom ends of the bag by the gussets 57. One vertical side of the length of tubing 51 is closed by joining the front and back walls by a heat-sealed side seam 59 (see FIGS. 15 and 16). The other vertical side is similarly closed by a heat-sealed side seam 61.

Prior to the heat-sealing at 61, a folded flattened tube 63 of heat-sealable material such as polyethylene is inserted in the tubing at the corner thereof which is to be the valve corner (the upper right corner as illustrated). This tube, in unfolded flat condition, has a total width approximating the gusset width (twice the gusset depth). It is folded in half generally on its longitudinal center line 65. It is specially prepared to be of non-heat-sealing character on the inside thereof in a zone intermediate its ends. This preparation may be by application of a non-heat-sealing band 67 corresponding to the band 47 described above for tube 45. The tube 63, folded in half on its longitudinal center line 65, is positioned to straddle the end portion of the gusset 57 at the valve corner of the tubing 51. A sheet of non-heat-sealing material, such as Teflon, is inserted from the outside into the gusset at the valve corner between the two panels 57a of the gusset 57 to keep these panels from becoming heat-sealed together, and then the tubing is heat-sealed along line 61 from top to bottom. As a result, the folded tube 63 becomes fused along line 61 to the front wall 53 and the back wall 55 and to the gusset panels 57a. The gusset panels at the valve corner do not become fused together, so that at this corner the gusset may spread out flat and permit tube 63 to spread out flat (see FIG. 16). The band 67 of non-heat-sealing material on the interior of the tube is located in the region of the heat-sealing and prevents the walls of tube 63 from sticking together.

In the completed bag, tube 63 constitutes a valve sleeve having a portion 63a extending into the bag through an opening at 69 in the side seam 61 at the stated corner of the bag, the folded tube being in line with and straddling the upper gusset 57 which extends to that corner, and having a portion 63b outside the bag adapted to receive a filling spout. The tube is heat-sealed where it extends through opening 69 at its exterior to the front wall 53 and the back wall 55 along the upper end portion of line 61 as shown in FIG. 15, and to the stated gusset 57 along a line 61g which appears in FIG. 16 and which extends across the end of the gusset.

FIG. 17 illustrates a third species which is a modification of the FIG. 15 bag wherein the tube 63, instead of having the band of tape 67 on its interior, has a paper liner 71 extending throughout its length. This serves the dual purpose of preventing heat-sealing together of the walls of the tube and making the tube stiffer.

FIGS. 18 and 19 illustrate a fourth species which is a modification of the FIG. 15 bag in which the four corners of the bag are cut off at a 45° angle, as indicated at 73, for the purpose of making the bag ends square up better when the bag is filled. This requires that the seam 59 have angled end portions 59a and 59b, also that seam 61 have angled end portions 61a and 61b. In this case, the seam across the end of the gusset will be of V-shape as indicated at 61h in FIG. 19, instead of being a straight line like seam 61g of FIG. 16. Also, in making the seams 59 and 61 in the FIG. 18 bag, non-heat-sealing separators are inserted in the gussets at all four corners to keep the gusset panels 57a from becoming heat-sealed together so that both ends of each gusset may spread out when the bag is filled (see FIG 19).

FIG. 20 illustrates a fifth species of valve bag of this invention, made from a length of ungusseted tubing 81 of heat-sealable plastic such as polyethylene. The front and back walls of the tubing are designated 83 and 85.

These are joined at the sides by integral folds 87 and at the top and bottom ends by transverse heat-sealed seams 89. The corner of the tubing which is to constitute the valve corner of the bag (the upper right corner as shown) is cut off at an angle as indicated at 91, thereby providing an opening 93 at one side of the tubing at this corner. A flattened tube 95 of heat-sealable material such as polyethylene having a non-heat-sealing band 97 corresponding to band 47 described above is inserted through the opening 93 extending at an angle to the upper end of the tubing corresponding to the angle of cut 91. Then the tube is heat-sealed as indicated at 99 where it extends through the opening 93 at its exterior to the front and back walls 83 and 85. This heat-sealing is along the non-heat-sealing band 97 so that the walls of the tube do not become fused together. The portion of the tube within the bag is designated 95a, and the portion of the tube outside the bag is designated 95b. Instead of having the tube 95 extend at the stated angle, it could extend at right angles to the side of the bag.

FIG. 21 illustrates a sixth species of valve bag of this invention, using the same tube 95 with the non-heat-sealing band as shown in FIG. 20. The FIG. 21 bag is also made from a length of ungusseted tubing, designated 101, of heat-sealable plastic such as polyethylene. The front and back walls of the tubing are designated 103 and 105. These are joined at the top and bottom ends by integral folds 107 and at the sides by heat-sealed seams 109. Prior to the heat-sealing of the right-hand side seam, as illustrated in FIG. 21, the tube 95 is inserted into the side of the tubing 101 at the upper right corner, which is to be the valve corner. As a result of the heat-sealing of the right-hand side seam, the tube 95, which then extends through an opening at 111 in this seam, is heat-sealed where it extends through the opening at its exterior to the front and back walls 103 and 105. This heat-sealing is along the band 97 so that the walls of the tube 95 are not fused together. The portion of tube 95 inside the bag is again designated 95a, and the portion of the tube outside the bag is again designated 95b.

FIGS. 22–25 illustrate the manufacture of a seventh species of valve bag of this invention, and FIG. 26 illustrates the valve corner of the completed bag. This bag is made from a length of gusseted tubing 121 of heat-sealable plastic such as polyethylene illustrated in FIG. 22. The front and back walls of this tubing are designated 123 and 125. These are joined at the sides by the gussets 127. The top and bottom ends of the tubing are closed by transverse heat-sealed seams 129. As shown in FIG. 23, the right-hand gusset 127, at the upper right-hand corner of the bag which is to become the valve corner, is spread flat at a line 131 extending transversely of the gusset adjacent the upper end of the bag. The resultant formation at this corner is similar to the formation which would result from filling the bag. It includes a triangular segment 133 of the gusset, the base of this segment being the line 131, and smaller triangular segments 135 of the gusset which extend between the sides or legs 137 of segment 133 and the top seam 129. Then, as shown in FIG. 24, an opening is provided in the segment 133 by making a transverse slit 139 therein. Then, as shown in FIG. 25, a flattened tube 141 of heat-sealable plastic such as polyethylene having a non-heat-sealing band 143 like those described above is inserted through the opening or slit 139 to the point where the band 143 registers with the line 131. The plane of the flattened tube 141 is transverse to the gusset. Then, as shown in FIG. 26, the corner of the bag is flattened out on the tube 141 and heat-sealing bars are applied to the top of the bag and below the line 131 extending crosswise of the tube to heat-seal the tube as indicated at 145 all around its exterior to the flattened corner adjacent line 131. The portion of the tube inside the bag is designated 141a and the portion of the tube outside the bag is designated 141b.

FIGS. 27 and 28 illustrate an eighth species which is a modification of the FIG. 26 bag. This is made similarly to the FIG. 26 bag, but using a wider tube 151 with a band of non-heat-sealing material 153. In this case, the triangular segment 133 has a slit 155 longer than slit 139, and is further slit as indicated at 157 from slit 155 back to the apex 159 of the segment 133 (see FIG. 27). This divides segment 133 into two smaller triangular flaps 161 which fold out flat against the top of the bag as illustrated in FIG. 28. Otherwise, the FIG. 28 bag corresponds to the FIG. 26 bag.

It will be observed that in each of the above-described bags, there is an opening in the bag, a tube of heat-sealable material constituting a valve sleeve extending through the opening with a portion thereof inside the bag and a portion thereof outside the bag, the tube being heat-sealed where it extends through the opening all around its exterior to the heat-sealable material of the bag. In each instance, the tube is open throughout its length, fusion of the walls of the tube being precluded in the case of the bags shown in FIGS. 12, 15, 18, 20, 21, 26 and 28, by reason of the non-heat-sealing band on the interior of the tube in the region where it is heat-sealed to the material of the bag, and in the case of the bag shown in FIG. 17, by reason of the paper liner 71 for the tube. Tubes other than those specifically shown herein may be used. For example, a polyethylene-coated paper tube may be used, the polyethylene being on the outside.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

A bag made of heat-sealable material having a front wall and a back wall joined at the bag ends by gussets and joined at the bag sides by heat-sealed seams, a flattened tube of flexible heat-sealable material folded in half generally on its longitudinal center line extending through an opening in one side seam at one corner of the bag, said folded tube being in line with and straddling that one of the gussets which extends to said one corner and having a portion inside the bag and a portion outside the bag, said tube being heat-sealed where it extends through said opening at its exterior to the front and back walls and to the said one gusset, said tube having a non-heat-sealing tape adhered to its interior in the region in which the tube is heat-sealed to the front and back walls and said one gusset.

References Cited in the file of this patent

UNITED STATES PATENTS

| | | |
|---|---|---|
| 1,993,377 | McNulty | Mar. 5, 1935 |
| 2,696,342 | Toborg | Dec. 7, 1954 |
| 2,708,067 | Paton | May 10, 1955 |
| 2,804,257 | Hasler et al. | Aug. 27, 1957 |

FOREIGN PATENTS

| | | |
|---|---|---|
| 521,497 | Belgium | Jan. 16, 1954 |
| 1,122,898 | France | May 28, 1956 |